US008027686B2

(12) United States Patent
Kim et al.

(10) Patent No.: US 8,027,686 B2
(45) Date of Patent: Sep. 27, 2011

(54) METHOD AND APPARATUS FOR ALLOCATING A CHANNEL TO A WIRELESS INTERFACE

(75) Inventors: Hyeong-seok Kim, Seongnam-si (KR); Min-soo Kim, Seoul (KR); Ji-young Kong, Seoul (KR); Song-yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1075 days.

(21) Appl. No.: 11/450,270

(22) Filed: Jun. 12, 2006

(65) Prior Publication Data

US 2006/0281467 A1    Dec. 14, 2006

(30) Foreign Application Priority Data

Jun. 11, 2005    (KR) .................. 10-2005-0050138

(51) Int. Cl.
*H04W 72/00* (2009.01)
(52) U.S. Cl. .................. 455/450; 455/452.1; 455/452.2; 455/464; 455/509; 455/516; 455/63.1; 455/526; 370/322; 370/329; 370/330; 370/341; 370/348; 370/395.41; 370/468
(58) Field of Classification Search .................. 455/540, 455/452.1, 509, 63.1, 526, 501
See application file for complete search history.

(56) References Cited

U.S. PATENT DOCUMENTS

| 5,509,047 | A | * | 4/1996 | Uchikura ...................... 455/464 |
|---|---|---|---|---|
| 5,873,047 | A | * | 2/1999 | Nakano et al. ................ 455/561 |
| 6,044,266 | A | * | 3/2000 | Kato .......................... 455/422.1 |
| 6,112,098 | A | * | 8/2000 | Flint et al. ..................... 455/464 |
| 6,127,946 | A | * | 10/2000 | Tzidon et al. ................. 340/988 |
| 6,188,905 | B1 | * | 2/2001 | Rudrapatna et al. ........ 455/452.2 |
| 6,295,453 | B1 | * | 9/2001 | Desgagne et al. ............ 455/448 |
| 6,331,973 | B1 | | 12/2001 | Young et al. |
| 6,349,091 | B1 | * | 2/2002 | Li ............................... 370/238 |
| 6,385,454 | B1 | * | 5/2002 | Bahl et al. .................... 455/450 |
| 6,549,782 | B2 | * | 4/2003 | Roy ............................. 455/450 |
| 6,788,702 | B1 | | 9/2004 | Garcia-Luna-Aceves et al. |
| 7,577,437 | B1 | * | 8/2009 | Friman et al. ................ 455/450 |
| 7,616,966 | B2 | * | 11/2009 | Nguyen ..................... 455/456.6 |
| 7,684,807 | B2 | * | 3/2010 | Schmidt ....................... 455/450 |
| 7,716,532 | B2 | * | 5/2010 | Horvitz ......................... 714/43 |
| 2002/0077152 | A1 | * | 6/2002 | Johnson et al. .............. 455/562 |
| 2003/0169697 | A1 | * | 9/2003 | Suzuki et al. ................. 370/310 |
| 2003/0219002 | A1 | * | 11/2003 | Kishida ........................ 370/338 |
| 2004/0110508 | A1 | | 6/2004 | Haartsen |
| 2004/0157613 | A1 | * | 8/2004 | Steer et al. ................... 455/446 |
| 2004/0185887 | A1 | | 9/2004 | Wolman et al. |
| 2004/0266351 | A1 | * | 12/2004 | Chuah et al. .................. 455/62 |

(Continued)

FOREIGN PATENT DOCUMENTS

DE    10064874 A1    7/2002

*Primary Examiner* — Kwasi Karikari
(74) *Attorney, Agent, or Firm* — Sughrue Mion, PLLC (57) ABSTRACT

An apparatus and a method for allocating a channel capable of minimizing interference between channels in a node on an Ad-hoc network using a plurality of wireless interfaces for communication are provided. The apparatus includes a receiving unit that receives information on channel allocation from neighboring nodes, a channel search unit that searches for channels through which the node can communicate with all the neighboring nodes with reference to the received information on channel allocation, and a channel allocation unit that allocates a channel to the wireless interfaces based on the result of the search, so that it is possible to improve efficiency of network bandwidth usage and decrease interference of the channels.

26 Claims, 6 Drawing Sheets

U.S. PATENT DOCUMENTS

2005/0037763 A1* 2/2005 Hamamoto et al. .......... 455/447
2005/0180356 A1* 8/2005 Gillies et al. .................. 370/329
2005/0202784 A1* 9/2005 Xu et al. ...................... 455/63.3
2005/0271006 A1* 12/2005 Chari et al. ................... 370/329
2006/0002368 A1* 1/2006 Budampati et al. ........... 370/351
2008/0259883 A1* 10/2008 Mishra et al. ................. 370/338

* cited by examiner

METHOD AND APPARATUS FOR ALLOCATING A CHANNEL TO A WIRELESS INTERFACE

CROSS-REFERENCE TO RELATED PATENT APPLICATION

This application claims priority from Korean Patent Application No. 10-2005-0050138, filed on Jun. 11, 2005, in the Korean Intellectual Property Office, the disclosure of which is incorporated herein in its entirety by reference.

BACKGROUND OF THE INVENTION

1. Field of the Invention

The present invention relates to a method and an apparatus for allocating a channel to a wireless interface, and more particularly, to a method and an apparatus for allocating a channel for minimizing interference between channels in a node on an Ad-hoc network which uses a plurality of wireless interfaces for communication.

2. Description of Related Art

Since all nodes in an 802.11 based Ad-hoc network use the same wireless channel, the performance of the network deteriorates due to channel interference which occurs in transmitting a packet between the nodes. Accordingly, a method of two-channel communication by using the nodes having two wireless interfaces in the network and different channels allocated to the wireless interfaces has been developed for improving a usage rate of each of the channels and decreasing interference between the channels.

Figure 1:
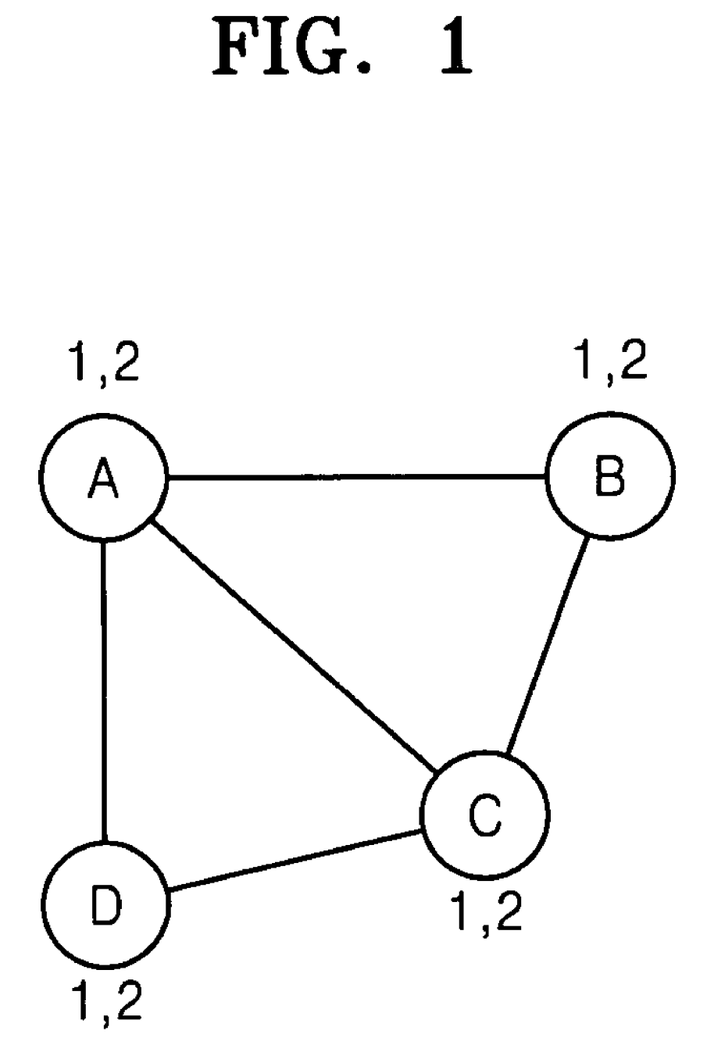
FIG. 1 is a diagram illustrating conventional technology of allocating channels to a wireless interface.

FIG. 1 is a diagram illustrating conventional technology for allocating channels to a wireless interface. As illustrated in FIG. 1, a wireless link is formed between two nodes of Node A, Node B, Node C, and Node D. Each of the nodes has two wireless interfaces and communicates with each other using first and second channels. The first and second channels are allocated permanently to each wireless interface of one of the nodes. In other words, when a node turns on, the first and second channels which have been already formed are allocated to each of the two wireless interfaces. For example, when the node A communicates with the node C, the nodes A and C determine which channel between the first and second channels is to be used.

If a communication status of the first channel is better, the first channel is used for communication. At this time, selection of a channel is related to which channels are used between neighbor nodes. In other words, when a communication status of the first channel deteriorates due to channels used between the nodes A and D, the nodes A and B, the nodes C and B, and the nodes C and D, the nodes A and C detect the communication status of the first channel and communicate with each other using the second channel.

According to the conventional technology described above, every node allocates channels permanently to a wireless interface and determines which channel of the allocated channels is to be used. In other words, since every node allocates permanently and uses the same two channels even when there are more channels available, the usage rate of the channels is still low. Therefore, the interference between the channels remains problematic. If a node has as many wireless interfaces as the number of channels available, the problem described above may be solved. However, this method is not desirable in terms of cost of the required hardware.

SUMMARY OF THE INVENTION

The present invention provides an apparatus and a method capable of improving efficiency of network bandwidth usage and decreasing interference between channels by dynamically allocating channels to a wireless interface.

According to an aspect of the present invention, there is provided a method of allocating a channel in a node having at least one wireless interface for communication in a wireless network which has a plurality of channels, the method comprising: receiving channel allocation information which represents channels allocated by neighboring nodes of the node; searching for a channel set having a minimal number of channels which has at least one channel in common to channels allocated to each of the neighbor nodes based on the received channel allocation information; and allocating a channel to the wireless interface according to the search result.

According to another aspect of the present invention, there is provided a computer-readable medium having embodied thereon a computer program for the method of channel allocation.

According to another aspect of the present invention, there is provided an apparatus for embodying a specific node having at least one wireless interface for communication in a wireless network which has a plurality of channels comprising: a receiving unit receiving channel allocation information which represents channels allocated by neighbor nodes of the node; a channel search unit searching for a channel set having a minimal number of channels which has at least one channel in common with channels allocated to each of the neighbor nodes based on the received channel allocation information; and a channel allocation unit allocating a channel to the wireless interface based on the search result.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Now, the exemplary embodiments of the present invention will be described in detail with reference to the accompanying drawings.

In the exemplary embodiments of the present invention described below, a node is assumed to have two wireless interfaces for purposes of illustration, however, the number of wireless interfaces is not limited thereto and may change.

Figure 2:
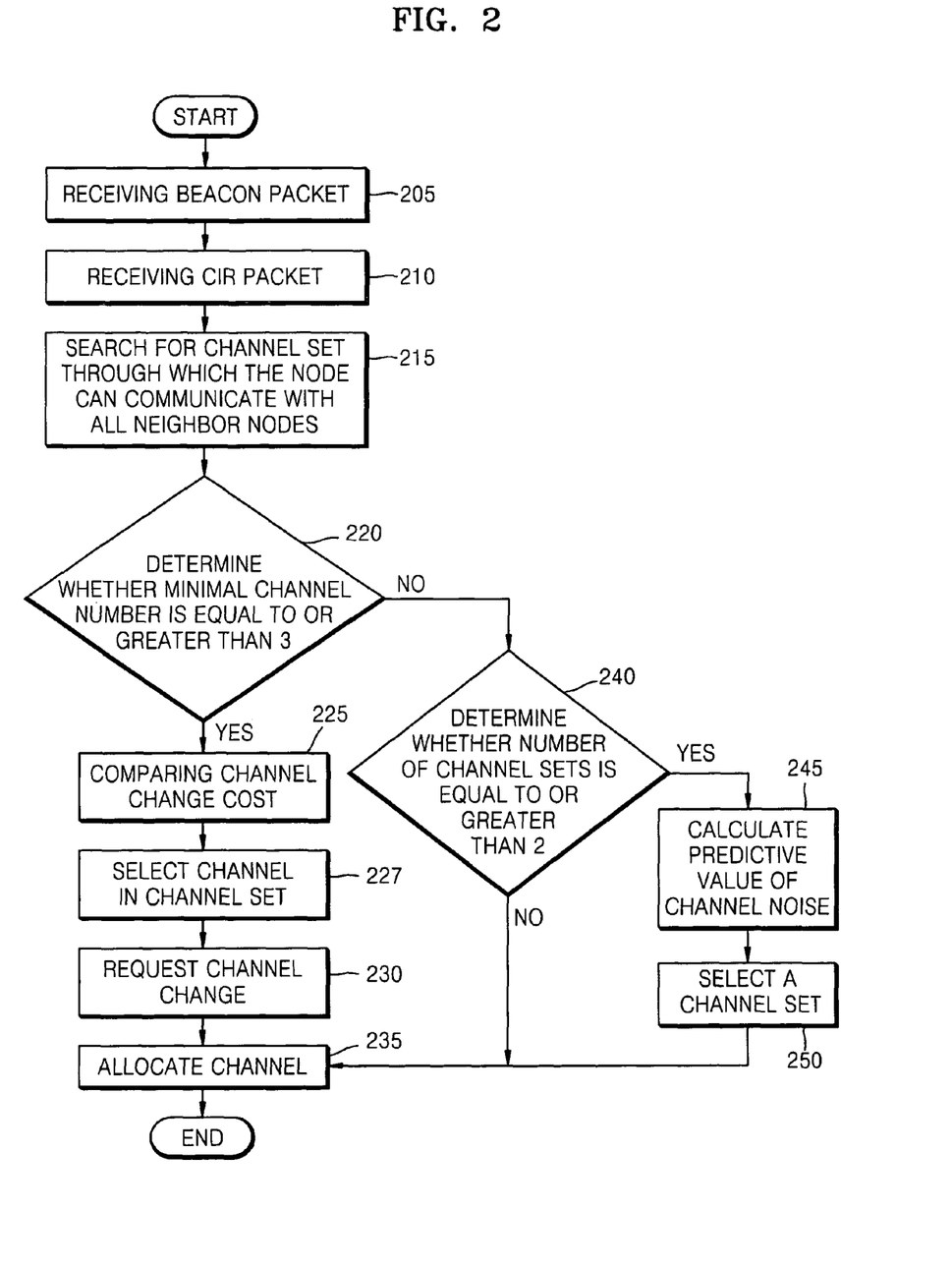
FIG. 2 is a flowchart illustrating a method of allocating channels according to an exemplary embodiment of the present invention.

FIG. 2 is a flowchart illustrating a method of allocating channels according to an exemplary embodiment of the present invention.

When a node (hereinafter referred to as "New Node") starts operating, the node receives beacon packets from all neighbor nodes 205. The beacon packet includes information of the channels which are allocated to the node transmitting the beacon packet. The information on channel allocation with the neighboring nodes can be collected by receiving the beacon packets. In addition, by receiving channel information response (CIR) packets which are transmitted from the neighboring nodes in response to a channel information query (CIQ) packet which the New Node transmits, a current status of channel usage of a whole network can be obtained 210. The CIQ and CIR packets will be described later in detail. After the information of channel allocation to the neighboring nodes is obtained from the beacon packets, the New Node searches for a channel set which is a set of channels capable of communicating with all the neighboring nodes and has a minimal number of channels 215. The number of the channel sets could be one, but two or more channel sets are assumed to be found for purposes of illustration in the exemplary embodiments of the present invention.

Next, it is determined whether the number of channels constituting each of the channel sets is three or more 220. If the number of channels is three or more, channel change cost for each of all the channels constituting the found channel sets is compared 225. Here, the channel change cost for a channel corresponds to information on how many nodes should subsequently change a channel in use on the whole network when a node changes the channel in use. When the New Node requests for the channel change cost by transmitting the CIQ packet to the neighbor nodes, the channel change cost is included in the CIR packet which is received from the neighbor nodes in response to the CIQ packet.

The New Node selects a channel set of which the channel change cost is the lowest according to a result of the comparison 225 and select two channels from the selected channel set. For example, when each of the found channel sets has three channels, the channel set including the channel corresponding to the lowest channel change cost is selected, and the two channels excluding the channel corresponding to the lowest channel change cost from the channel set are selected for allocation 227.

After requesting a change of channels in use with the neighbor nodes 230, which none of the selected channels is allocated to, only the channel corresponding to the lowest channel change cost of the channels of the selected channel set is allocated to, by transmitting the CCR packets to the neighbor nodes 230, the selected couple of channels are allocated to wireless interfaces 235. The request for changing a channel in use may be performed after the allocation of the channels.

If the minimal number of channels of each of the channel sets is determined to be three in operation 220, the channel set which includes the channel corresponding to the lowest channel change cost is selected. However, for example, if the number of channels of the channel set is four, the number of channels to be changed for selecting a couple of channels is two. Therefore, a channel set corresponding to the lowest sum of channel change costs for two channels may be selected.

If the number of channels is determined to be less than 3 in operation 220, it is determined whether the number of the channel sets is two or more 240. However, if there is only one channel set, one channel or a couple of channels are allocated to the wireless interfaces 235, and the procedure ends.

If the number of channel sets is two or more, the New Node should select one of the channel sets based on a predictive value of channel noise is calculated for each of the channel sets 245. The predictive value of channel noise is reference information used for determining communication quality such as a receiving sensitivity of the corresponding channel, and the predictive value will be described later in detail. The predictive value of channel noise for each of the channel set may be calculated by adding predictive values of channel noise for the channels composing the corresponding channel set. The New Node selects a channel set which has the lowest predictive value of channel noise according to the calculated predictive values of channel noise 250 and allocates a channel or a couple of channels composing the channel set to the wireless interfaces 235.

Figure 3:
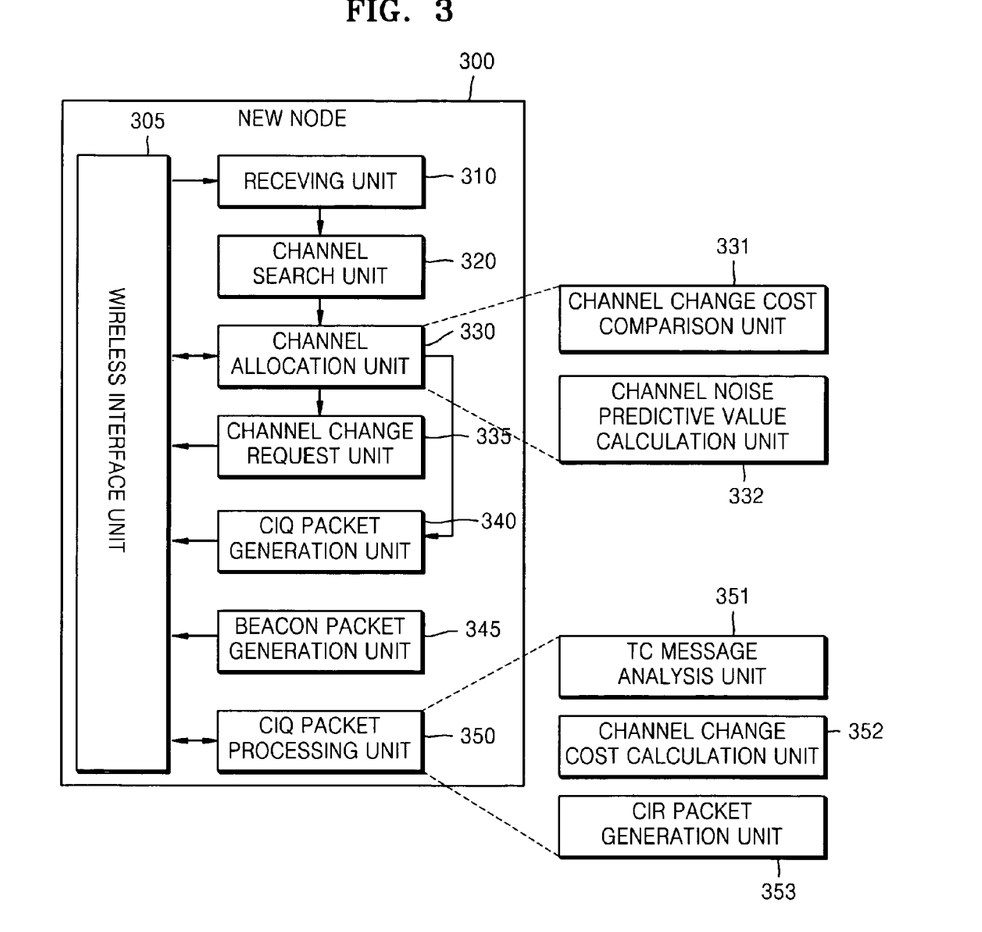
FIG. 3 is a block diagram of an apparatus for allocating channels according to an exemplary embodiment of the present invention.

FIG. 3 is a block diagram of an apparatus for allocating channels according to an exemplary embodiment of the present invention.

As illustrated in FIG. 3, the apparatus which is embodied as a New Node 300 includes a wireless interface unit 305, a receiving unit 310, a channel search unit 320, a channel allocation unit 330, a channel change request unit 335, a CIQ packet generation unit 340, a beacon packet generation unit 345, and a CIQ packet processing unit 350.

The wireless interface unit 305 is used for communication of other nodes in a wireless network. In the embodiments of the present invention, it is assumed that there are two wireless interfaces capable of allocating two channels, but more wireless interfaces may be included according to an embodiment as described above. The receiving unit 310 receives various packets through the wireless interface unit 305. The channel search unit 320 extracts information of channel allocation with neighbor nodes from a beacon packet which has been received by the receiving unit 310 and searches for a channel capable of communicating with all of the neighbor nodes.

The channel allocation unit 350 is allocates a channel to the wireless interface unit 305. The channel allocation unit 350 includes a channel change cost comparison unit 331 and a channel noise predictive value calculation unit 332. The channel allocation unit 350 compares channel change cost for all the channels of the found channel sets if a minimal number of channels is found by the channel search unit 320, for example, when the number of channels of the found channel sets is three or more. The channel noise predictive value calculation unit 332 calculates predictive values of channel noise representing the quality of communication for all the channels of the found channel sets if the minimal number of channel sets found in the channel search unit 320 is equal to two or more.

The channel change request unit 335 selects and allocates two channels of the channel set selected in the channel allocation unit 330 based on the channel change cost and requests a channel change by generating a CCR packet and transmitting the CCR packet to the neighbor nodes which do not use the selected channels.

The CIQ packet generation unit 340 generates a CIQ packet and transmits to the neighbor nodes. The CIQ packet is used to request the neighbor nodes for information on the channel change cost and information on channels used between the associated neighbor node and the remaining neighbor nodes.

The beacon packet generation unit 345 generates and transmits periodically to the neighbor nodes a beacon packet which includes a network address and information on allocated channels of the New Node 300. The CIQ packet processing unit 350 transmits a CIR packet in response to the CIQ packet received from the neighbor nodes. The CIQ packet processing unit 350 includes a topology control (TC) message analysis unit to analyze a TC message for obtaining information of the whole network topology, a channel change cost calculation unit 352 which calculates a channel change cost of each channel, and a CIR packet generation unit 353 which generates the CIR packet in response to the CIQ packet and transmits the CIR packet to a node transmitting the CIQ packet. The TC message will be described later.

Figure 4:
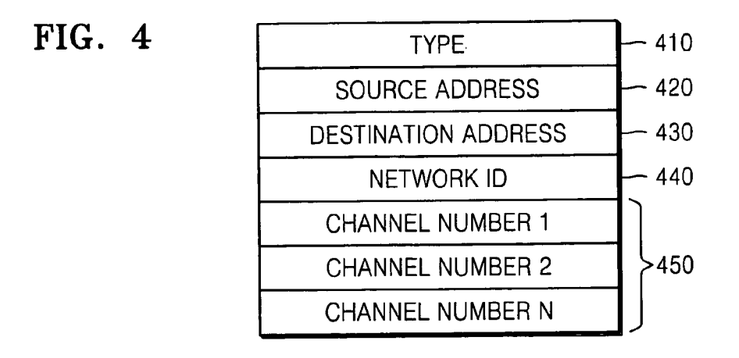
FIG. 4 is a diagram illustrating a format of a beacon packet according to an exemplary embodiment of the present invention.

FIG. 4 is a diagram illustrating a format of a beacon packet according to an embodiment of the present invention.

A Type field 410 is used to represent a type of a packet. A Source Address field 420 is used to represent a network address of a node which transmits the beacon packet. A Destination Address field 430 is used to represent a network address of a node which is to receive the beacon packet. Since a beacon packet is broadcasted to all the neighbor nodes, the destination address of the beacon packet has a form of a broadcast address. In this exemplary embodiment present invention, there is no limitation on a form of an address, so an address field may be an address of a hardware address of 48 bits used in an 802.11 or an IPv4 address of 32 bits. A Network ID field 440 is used to represent a network like a BSS ID used in 802.11. The Network ID field 440 may be omitted when network identification is not required. A Channel Number field 450 represents a channel allocated to the wireless interface by a node which transmits the beacon packet. The number of the Channel Number fields is the same as the number of the wireless interfaces. The beacon packet which is transmitted by a node having N wireless interfaces has N Channel Number fields.

Figure 5:
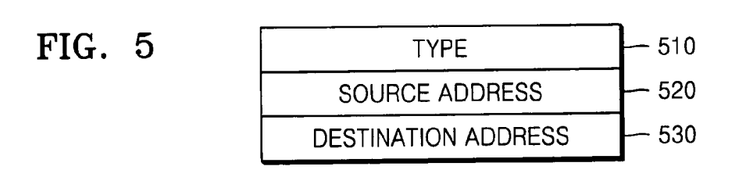
FIG. 5 is a diagram illustrating a format of a channel information query (CIQ) packet according to an exemplary embodiment of the present invention.

FIG. 5 is a diagram illustrating a format of a channel information query (CIQ) packet according to an exemplary embodiment of the present invention. A CIQ packet is used to obtain channel information of the neighbor nodes. The CIQ packet includes a Type field 510, a Source Address field 520, and a Destination Address field 530.

The Type field 510, the Source Address field 520, and the Destination Address field 530 are the same as the fields described with reference to FIG. 4, thus detailed description here is omitted. The CIQ packet can be transmitted using a unicast method a broadcast method, or the like according to a destination to which the packet is transmitted.

Figure 6:
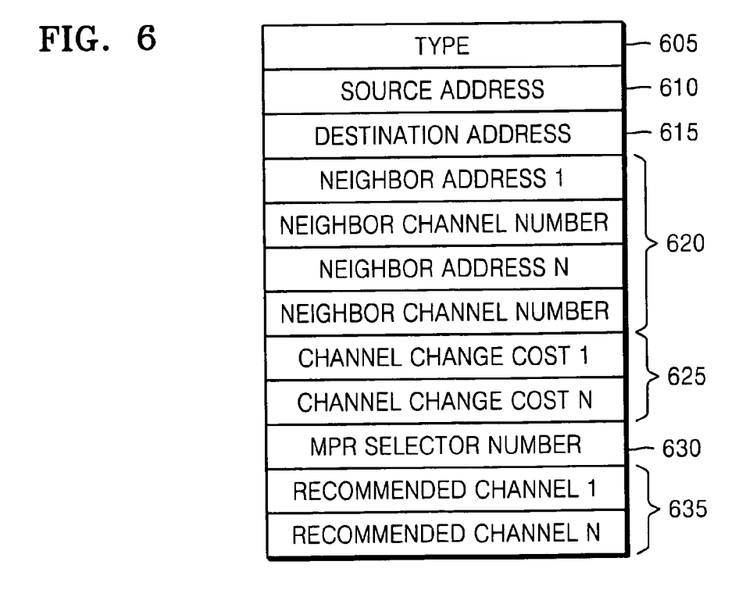
FIG. 6 is a diagram illustrating a format of a channel information response (CIR) packet according to an exemplary embodiment of the present invention.

FIG. 6 is a diagram illustrating a format of a channel information response (CIR) packet according to an embodiment of the present invention A CIR packet is used for responding to a CIQ packet. A Type field 605 represents a type of a packet, a Source Address field 610 represents an address of a node which transmits the CIR packet, and a Destination Address field 615 represents an address of a node which has transmitted the CIQ packet, that is, a node which is to receive the CIR packet.

A group field 620 including a Neighbor Address field and a Neighbor Channel Number field represents information of neighbor nodes of a node which transmits the CIR packet and information of a channel which is used for communication of the neighbor nodes, respectively. In the CIR packet of a node having N neighbor nodes, N fields of the Neighbor Address field and the Neighbor Channel field are included. A Channel Change Cost field 625 represents channel change cost information on how many nodes should change a channel in use subsequently in a whole network, when the node which transmits the CIR packet changes the channels in use. If the number of channels in use is N, N Channel change cost fields are included in the CIR packet.

A multi-point relay (MPR) selector number field 630 represents the number of nodes which designate MPRs to the nodes which transmit the CIR packet when the node which transmits the CIR packet is an MPR of an optimized link state routing (OLSR) protocol. Here, an MPR is a node configured to transmit a broadcast packet received from the neighbor nodes to the remaining neighbor nodes for an effective transmission of the broadcast packet. An MPR is disclosed in OLSR protocol specifications, so detailed description of an MPR is omitted. When there are many MPR selectors, it means that there may be a high possibility of interference for channels which the MPR node uses. When the node which transmits the CIR packet is not an MPR node, 0 is recorded in the MPR selector number field 630.

In a Recommended Channel field 635, information is recorded on the channel which the node which transmits the CIR packet recommends to the node which has transmitted the CIQ packet according to self-judgment of the node transmitting the CIR packet. A criterion for the judgment is not specifically limited in the present invention. The Recommended Channel field 635 may be omitted.

Figure 7:
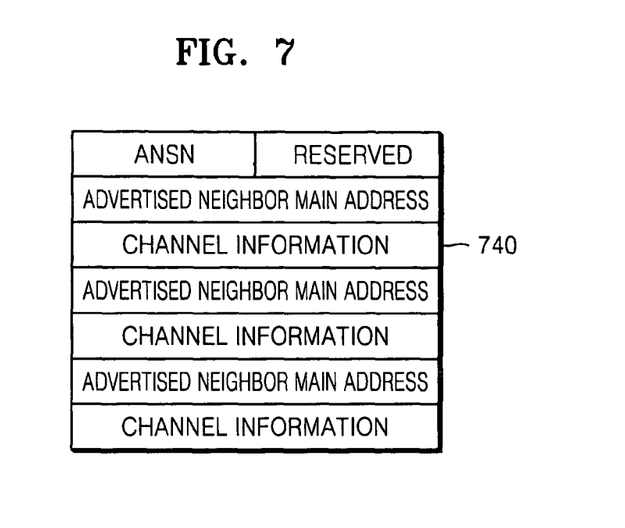
FIG. 7 is a diagram illustrating a format of a topology control (TC) packet according to an exemplary embodiment of the present invention.

FIG. 7 is a diagram illustrating a format of a topology control (TC) message according to an exemplary embodiment of the present invention.

A TC message is transmitted between nodes which use an OLST protocol. By receiving the TC message, a node which receives the TC message can obtain information of a topology of the whole network. In the TC message according to this embodiment of the present invention, a channel information 740 field may be added to the conventional TC message, so that information of channel usage of the whole network can be obtained. Detailed description of the TC message is disclosed in specifications of the OLSR protocol and is omitted here.

Figure 8:
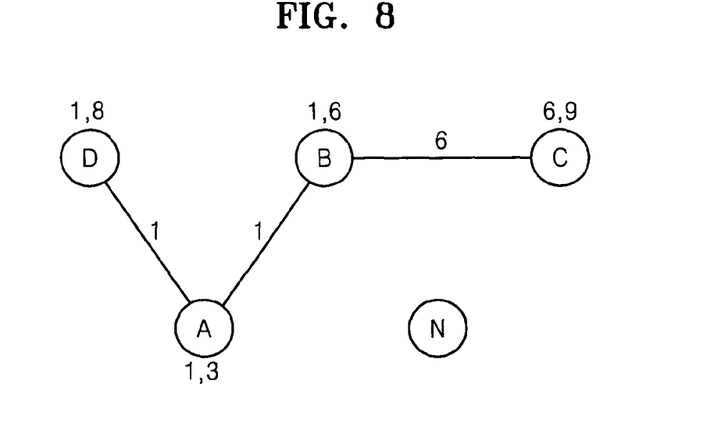
FIG. 8 is a structural diagram of a network illustrating a method of allocating channels according to an exemplary embodiment of the present invention.

FIG. 8 is a structural diagram of a network illustrating a method of allocating channels according to an exemplary embodiment of the present invention. At first, when a node N starts operating and detects that a channel is in use by scanning channels, the node N receives beacon packets of neighbor nodes and manages address information of the neighbor nodes and channel allocation information of the neighbor nodes as a table. In addition, the node N transmits a CIQ packet to the neighbor nodes and obtains information of status of channel usage and channel change cost by receiving a CIR packet.

To describe this process in detail, at first, the node N scans a first channel to find node A and node B, transmits a CIQ packet to each of the nodes, and receives a CIR packet in response to the CIQ packet. The CIR packet which the node A transmits includes: information of the first channel and a third channel which are allocated by the node A to a wireless interface of the node A, information of the neighbor node B, the first channel which is used for communicating with the node B, information of the neighbor node D, the first channel which is used for communicating with the node D, and channel change cost for the first channel in use. Information of a recommended channel and the number of MPR selectors of the node A may be included according to this exemplary embodiment of the present invention. Similarly, a CIR packet of the node B is generated and transmitted.

The node N searches for a channel set of channels through which the node N can communicate with all the neighbor nodes. This may be performed by referencing the received beacon packet. Referring to FIG. 8, since first and third channels are allocated to the node A, first and sixth channels to the node B, sixth and ninth channels to node C, channel sets having minimal number of channels through which the node N can communicate with all the neighbor nodes are [1,9] and [3,6]. Here, since the number of channels of the channel sets is two, the node N selects one of the channel sets and allocates channels of the selected channel set to the wireless interface. To select one of the two channel sets, the node N calculates predictive values of channel noise for all the channels of the channel sets. To obtain required channel usage information of the neighbor nodes for calculating the predictive values of channel noise, the node N references a CIR packet which is received in response to the CIQ packet.

The node N can determine from the CIR packet that the node A and the node D are communicating with each other through a first channel. The node N can obtain information about the node B and the node C which communicate with each other through a sixth channel from the same procedure.

Now that the node N has obtained information of channel usage of the neighbor nodes, the node N should calculate predictive values of channel noise and select one of the channel sets [1,9] and [3,6] by referencing the predictive values. The predictive value for a predetermined channel can be calculated by referencing how frequently the channel is used in 2-hop distance and how frequently the channel is allocated to the neighbor nodes.

In the exemplary embodiment of the present invention, the predicted value of channel noise of a channel is calculated by adding the frequency of the channel used in the 2-hop distance and the frequency of the channel allocation to the neighbor nodes. For example, since the sixth channel is used once between the node B and the node C and once between the node C and the node B and allocated to the node B once and to the node C once, the predictive value of channel noise of the sixth channel is 4. If calculated by the same method, the predictive value of channel noise for the first channel is one, for the ninth channel is one, and for the third channel is one. Accordingly, by adding the predictive values of channel noise, the predictive value of channel noise for the channel set of [1,9] is six and for the channel set of [3,6] is five. The lower the predictive value of channel noise for a channel set is, the better an environment of the channel is and, thus, the node N selects the channel set of [3,6] of which the predictive value of channel noise is 5 and allocates the third channel and the sixth channel to the wireless interface.

A method of calculating the predictive value of channel noise for a channel when the channel is used by a neighbor node which has more MPR selectors is applicable, too.

Figure 9:
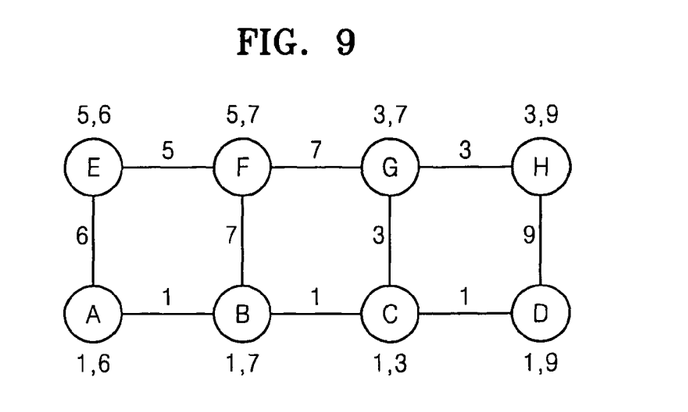
FIG. 9 is a diagram illustrating channel change cost according to an exemplary embodiment of the present invention.

FIG. 9 is a diagram illustrating channel change cost according to an exemplary embodiment of the present invention.

As described above, when the minimal number of channels of a channel set through which the New Node, can communicate with all the neighbor nodes is equal to or greater than 3, the New Node selects a channel set having channels which have lower channel change cost, allocates channels of the channel set to the wireless interface, and requests to change a channel in use with the neighbor nodes which do not use the allocated channel. The channel change cost which is required in this process is calculated by the neighbor nodes, then included in a CIR packet, and transmitted.

As illustrated in FIG. 9, node A is using a first channel and a sixth channel. The sixth channel is not used in any other node than the node A and node E. Accordingly, only the node A and node E need to change a channel in use when the node A replaces the sixth channel with another channel, so the channel change cost for the sixth channel is 2. Meanwhile, since the first channel is used between the node A and the node B, the node B and the node C, and the node C and the node D, the channel change cost for the first channel is four. Accordingly, in a CIR packet which the node A transmits, the channel change cost for the first channel and the sixth channel as calculated above is recorded. As described above, to calculate the channel change cost accurately, every node may have information of the network topology of the whole network and the status of channel usage, and the TC message described above is used for this purpose.

Figure 10:
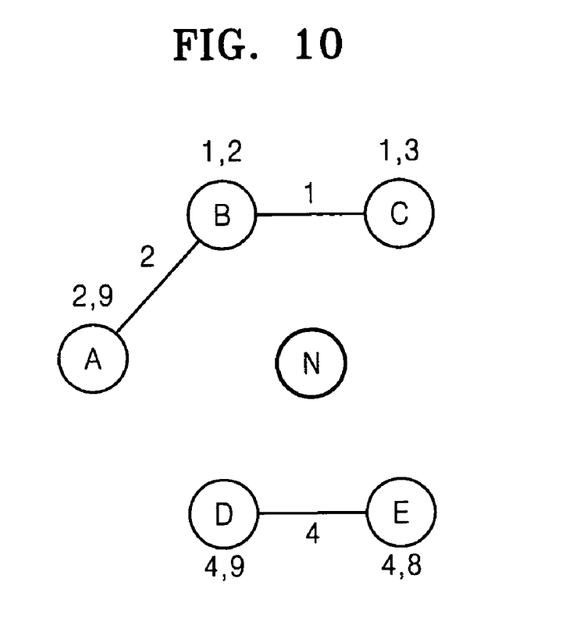
FIG. 10 is a structural diagram of a network illustrating a method of allocating channels to a wireless interface according to an exemplary embodiment of the present invention.

FIG. 10 is a structural diagram of a network illustrating a method of allocating channels to a wireless interface according to an exemplary embodiment of the present invention.

When the node N starts operating, the node N at first finds a node A, a node B, a node C, a node D, and a node E by a scan process, and collects channel information by receiving a beacon packet and a CIR packet. In this embodiment of the present invention, there are channel sets of [1,4,9], [1,4,2], and [2,3,4] through which the node N can communicate with all the neighbor nodes. But, the node N has two wireless interfaces in this embodiment of the present invention, so the node N should request to change a channel in use to some of the neighbor nodes for communicating with all the neighbor nodes.

In this process, the channel change cost described above is used for a selection criterion. If the channel change cost for the third channel has the lowest value, the node N transmits a CCR packet which requests to change a channel in use to the node C in which the third channel is allocated. Since the third channel is selected as a channel to be changed, the node N selects [2,3,4] of the channel sets and allocates a second channel and a fourth channel of the channels of the selected channel set, excluding the third channel, to the wireless interface.

The node C which receives the request to change a channel should allocate one of the selected second channel and fourth channel in a replacement of the third channel, and in this process the predictive value for channel noise as described above is used as criterion for the selection. In other words, since the node C should allocate a channel having a lower predictive value of channel noise of the second channel and the fourth channel in a replacement of the third channel, the node, N calculates and compares the predictive values of channel noise for the two channels, records information of the channel having a lower predictive value of channel noise in a New Channel Number field of a CCR packet, and transmits the CCR packet to the node C, and then the node C which has received the CCR packet replaces the third channel with the requested channel.

Figure 11:
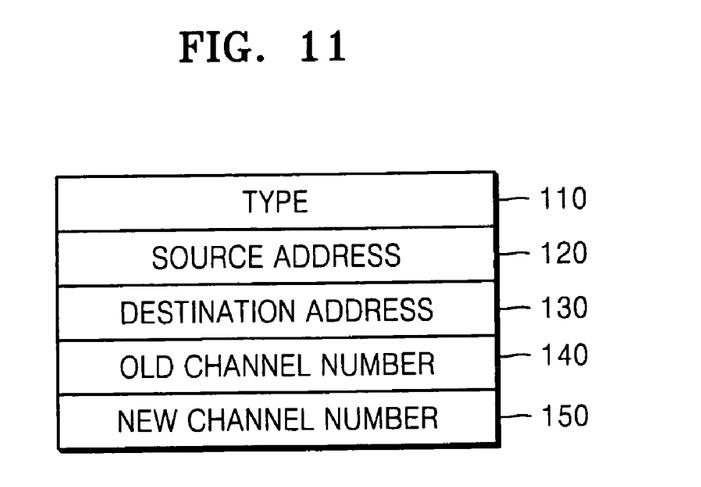
FIG. 11 is a diagram illustrating a format of a channel change request (CCR) packet according to an exemplary embodiment of the present invention.

FIG. 11 is a diagram illustrating a format of a channel change request (CCR) packet according to an exemplary embodiment of the present invention.

In a Type field 110, information for differentiating a type of a packet is recorded, in a Source Address field 120, information of a network address of a node which transmits the CCR packet is recorded, and in a Destination Address field 130, information of a network address of a node which receives the CCR packet is recorded. In an Old Channel Number field 140, information of the old channel to be changed is recorded. In a New Channel Number field 150, information of a new channel to replace the old channel is recorded. The invention can also be embodied as computer readable codes on a non-transient computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to an aspect of the present invention, it is possible to maximize bandwidth usage of a network by dynamically allocating a channel to a wireless interface and to maintain a good quality of communication in using a plurality of channels by selecting a channel having less interference for allocation to the wireless interface with priority. In addition, when a channel is required to be changed in the neighbor nodes, an aspect of the present invention permits minimizing channel change cost in changing a channel by collecting channel information of a whole network, calculating the number of nodes among connected nodes in which a channel in use should be changed subsequently when a channel in the node is changed for selecting a channel to replace, and requesting to change a channel with the neighbor nodes based on a result of the calculation.

While several aspects of the present invention have been particularly shown and described with reference to exemplary embodiments thereof, it will be understood by those skilled in the art that various changes in form and details may be made therein without departing from the spirit and scope of the present invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of allocating a channel of a predetermined node having at least one wireless interface for communication in a wireless network which has a plurality of channels, the method comprising:
    receiving channel allocation information which represents channels allocated by neighbor nodes of the predetermined node;
    searching for a channel set having a minimal number of channels which has at least one channel in common to the channels allocated to each of the neighbor nodes with reference to the received channel allocation information; and
    allocating a channel to the wireless interface according to a search result of the searching for a channel set,
    wherein, when the minimal number of the channels in the search result is greater than a threshold number, the allocating a channel to the wireless interface comprises:
    selecting one channel set from one or more found channel sets based on the search result;
    selecting at least one channel of the selected channel set and allocating the selected channel to the wireless interface; and
    requesting for changing a channel in use with the neighbor nodes which have no channel in common to the channels allocated to the wireless interface.

2. The method of claim 1,
    wherein the selecting one channel set and the selecting the at least one channel are performed based on a channel change cost for the found channel sets, and
    wherein the channel change cost is information based on a number of nodes which would change a channel in use when the predetermined node changes the channel in use.

3. The method of claim 2, wherein the channel change cost of a channel in the node is included in a packet which is transmitted by the neighbor nodes.

4. A non-transitory computer-readable medium having embodied thereon a computer program for the method according to claim 3.

5. A non-transitory computer-readable medium having embodied thereon a computer program for the method according to claim 2.

6. The method of claim 1, wherein, when the number of channels in the search result is equal to or smaller than a threshold number, and one channel set is found, the channel of the found channel set is allocated to the wireless interface.

7. A non-transitory computer-readable medium having embodied thereon a computer program for the method according to claim 6.

8. The method of claim 1, wherein, when the number of channels in the search result is equal to or smaller than a threshold number, and two or more channel sets are found, the allocating the channel to the wireless network comprises:
    calculating a predictive value of channel noise for each of channels belonging to the channel sets;
    selecting one of the channel sets based on the result of the calculation of the predictive value of the channel noise; and
    allocating a channel of the selected channel set to the wireless interface.

9. The method of claim 8, wherein the predictive value of the channel noise for a predetermined channel is calculated based on how frequently the channel is used between the neighbor nodes.

10. A non-transitory computer-readable medium having embodied thereon a computer program for the method according to claim 9.

11. The method of claim 8, wherein the predictive value of the channel noise for a predetermined channel is calculated based on how frequently the channel is used between the neighbor nodes and nodes which are linked to the predetermined node via the neighbor nodes.

12. A non-transitory computer-readable medium having embodied thereon a computer program for the method according to claim 11.

13. The method of claim 8, wherein the predictive value of the channel noise for a predetermined channel is calculated based on how frequently the channel is allocated to the neighbor nodes.

14. A non-transitory computer-readable medium having embodied thereon a computer program for the method according to claim 13.

15. A non-transitory computer-readable medium having embodied thereon a computer program for the method according to claim 8.

16. The method of claim 1, wherein the channel allocation information is included in a packet which is transmitted periodically by the neighbor nodes.

17. A non-transitory computer-readable medium having embodied thereon a computer program for the method according to claim 16.

18. A non-transitory computer-readable medium having embodied thereon a computer program for the method according to claim 1.

19. An apparatus for allocating a channel in a wireless network comprising:
    a receiving unit that receives channel allocation information which represents channels allocated by neighbor nodes of a node;

a channel search unit that searches for a channel set having a minimal number of channels which has at least one channel in common to channels allocated to each of the neighbor nodes based on the received channel allocation information;

a channel allocation unit that allocates a channel to the wireless interface based on the search result of the channel search unit;

a channel change cost comparison unit that compares channel change costs for all channels which belong to one or more channel sets found by the channel search unit, when the minimal number of channels which are found in the channel search unit is greater than a critical number; and a channel change request unit that requests changing a channel in use in neighbor nodes, wherein the channel allocation unit selects a channel of one channel set of the one or more found channel sets based on the channel change cost comparison result of the channel change cost comparison unit and allocates the channel to the wireless interface.

20. The apparatus of claim 19, further comprising a channel noise predictive value calculation unit that calculates a predictive value of channel noise in the node for channels of each of the found channel sets, when the minimal number of channels which are found by the channel search unit is equal to or smaller than a critical number, and two or more channel sets are found, wherein the channel allocation unit allocates channels of a channel set corresponding to the lowest sum of predictive values among the found channel sets.

21. The apparatus of claim 20, wherein the channel noise predictive value calculation unit determines the calculated predictive value of channel noise for a predetermined channel as a higher value when the predetermined channel is used more frequently between the neighbor nodes.

22. The apparatus of claim 20, wherein the channel noise predictive value calculation unit determines the calculated predictive value of channel noise for a predetermined channel as a higher value when the channel is used more frequently between the neighbor nodes and nodes to which the predetermined node is linked via the neighbor nodes.

23. The apparatus of claim 20, wherein the channel noise predictive value calculation unit determines the calculated predictive value of channel noise for a predetermined channel as a higher value when the predetermined channel is allocated more frequently to the neighbor nodes.

24. The apparatus of claim 19, wherein, the channel allocation unit allocates the channels of a channel set found by the channel search unit, when the minimal number of channels found in the channel search unit is equal to or smaller than a threshold number, and when one channel set is found.

25. The apparatus of claim 19, wherein the channel change cost is calculated based on a number of nodes among the neighbor nodes of the node and other nodes which are linked to the node via the neighbor nodes which would change a channel in use, if the channel change request units requests changing a channel in use.

26. The apparatus of claim 19, wherein the channel change cost is included in a packet which is transmitted by the neighbor nodes.

* * * * *